United States Patent
Bodin

[19]

[11] Patent Number: 6,146,076

[45] Date of Patent: Nov. 14, 2000

[54] SUPPORT STRUCTURE INCLUDING A SNAP NUT

[76] Inventor: Rick Bodin, 1460 Etna St., St. Paul, Minn. 55106

[21] Appl. No.: 09/336,321

[22] Filed: Jun. 18, 1999

Related U.S. Application Data

[63] Continuation-in-part of application No. 09/139,453, Aug. 25, 1998, abandoned.

[51] Int. Cl.[7] .................................................. F16B 37/08
[52] U.S. Cl. ........................ 411/433; 411/433; 411/539; 211/187
[58] Field of Search ................................. 211/187, 90.02; 411/437, 435, 433, 907, 908, 539

[56] References Cited

U.S. PATENT DOCUMENTS

| | | |
|---|---|---|
| 1,265,373 | 5/1918 | Philip . |
| 2,633,735 | 4/1953 | Dondero . |
| 3,616,929 | 11/1971 | Jessmore . |
| 4,226,164 | 10/1980 | Carter . |
| 4,343,496 | 8/1982 | Petranto . |
| 4,521,144 | 6/1985 | Ginter . |
| 4,531,872 | 7/1985 | Wartotsh . |
| 4,600,344 | 7/1986 | Sutenbach et al. . |
| 4,978,261 | 12/1990 | Wright, III . |
| 5,039,266 | 8/1991 | Nagayoshi et al. . |
| 5,054,163 | 10/1991 | Sterling ................................. 411/435 |
| 5,087,161 | 2/1992 | Gunn . |
| 5,518,351 | 5/1996 | Peil . |
| 5,779,070 | 7/1998 | Dickinson . |

FOREIGN PATENT DOCUMENTS

| | | | |
|---|---|---|---|
| 2410168 | 6/1976 | France | ................................. 411/437 |
| 2723058 | 11/1978 | Germany | ................................. 411/437 |

*Primary Examiner*—Flemming Saether
*Attorney, Agent, or Firm*—Nikolai, Mersereau & Dietz, P.A.

[57] ABSTRACT

A plastic snap nut is in the form of a molded plastic tubular member with a radially extending flange. The tubular member has a threaded bore and a slot formed through its wall into the bore. The slot width is slightly less than the diameter of the bore. The nut is sufficiently resilient, allowing it to be snapped onto an elongated threaded rod from the side at any location along the length of the rod, making it unnecessary to screw it on to the rod from one end thereof. Once secured, the threads on the nut engage the threads on the rod, allowing the nut to be repositioned by rotating it.

5 Claims, 6 Drawing Sheets

SUPPORT STRUCTURE INCLUDING A SNAP NUT

CROSS REFERENCE TO RELATED APPLICATIONS

This application is a continuation-in-part of application Ser. No. 09/139,453, filed Aug. 25, 1998 (now abandoned).

FIELD OF THE INVENTION

The present invention relates to threaded nuts, and more particularly, to a threaded nut that can be snapped onto a threaded rod anywhere along its length.

BACKGROUND OF THE INVENTION

Certain applications require the use of a threaded nut positioned on an elongated threaded rod at a distance from an end of the threaded rod. The most common approach to positioning the threaded nut on the rod is to place the nut onto the rod at one end and then rotate the nut along the threaded rod until it reaches the desired position. Such a task is frequently done manually and is often time consuming and tedious. Additionally, difficulties may be encountered if the threaded rod has a bend over which the nut cannot be rotated.

One prior art approach is to use a split or two piece nut such as is shown in U.S. Pat. No. 4,226,164 to Carter and U.S. Pat. No. 5,039,266 to Nagayoshi, et al. Each unit of the split nut has a threaded interior and overlapping ends that engage each other to form a complete nut securely fastened about the threaded rod. One difficulty with such nuts is that each unit needs to have the proper threaded interior to match its opposing unit. Furthermore, the two halves can easily be lost or misplaced and difficult to handle due to their small size.

Another approach uses a nut with an opening sufficient to allow the nut to snap onto the threaded shaft at the desired location as shown in U.S. Pat. No. 4,521,144 to Ginter and U.S. Pat. No. 4,978,261 to Wright, III. In each of these prior art patents, the nuts act as a stop on a threaded shaft and requires an extra mechanism to ensure that the threaded nut is securely retained in its position on the threaded shaft. More particularly, the Ginter stop nut includes a set screw to tighten the nut in place and ensure that the threads on the nut and the shaft engage. A spring loaded ball detent is used in the Wright patent to retain the nut on the threaded shaft. Such threaded nuts with small components are difficult to manufacture.

Therefore, what is needed is a unibody, internally threaded nut that can be readily snapped onto a threaded rod so at to be coaxially centered so that the threads on the rod engage those on the nut.

SUMMARY OF THE INVENTION

The present invention comprises a unibody nut fabricated as a molded plastic tubular member with a radially extending flange around its exterior surface. The tubular member has a threaded bore and a slot formed through the wall of the tubular member that extends from the exterior surface and into the threaded bore along the length of the nut. The slot width is slightly less than the diameter of the bore. In use, the nut is sufficiently resilient so as to allow it to be snapped onto an elongated threaded rod from the side at any location along the length of the rod, making it unnecessary to screw it onto the rod from the end thereof. The nut and rod threads engage and the nut can then be rotated on the threaded rod to the desired location. The nut can also be removed by spreading the nut until the slot is wider than the rod diameter and then pulling the nut off the threaded rod. The snap nut finds a range of applications and is especially suited for suspending objects from the threaded rod.

DESCRIPTION OF THE DRAWINGS

These and other features and advantages of the present invention will become apparent upon reading the following detailed description in conjunction with the drawings in which.

DETAILED DESCRIPTION OF THE PREFERRED EMBODIMENT

Figure 1:
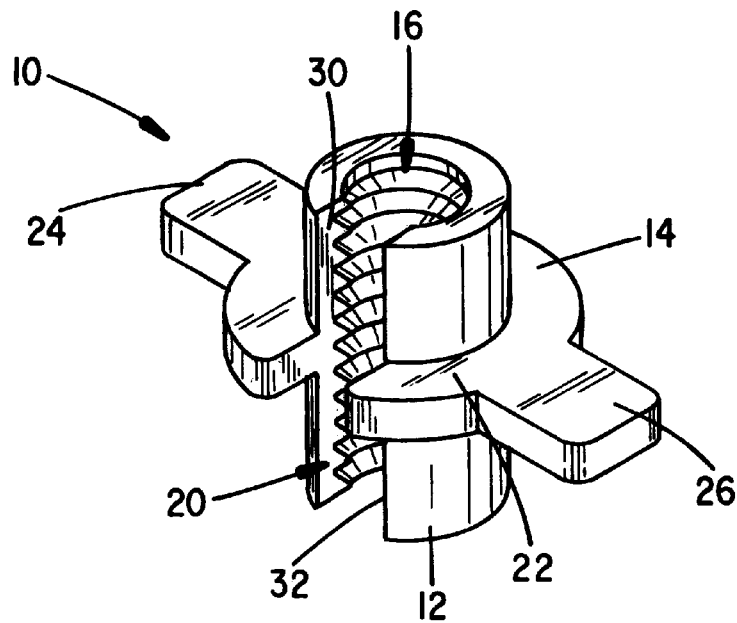
FIG. 1 is a perspective view of the snap nut of the present invention.
Figure 3:
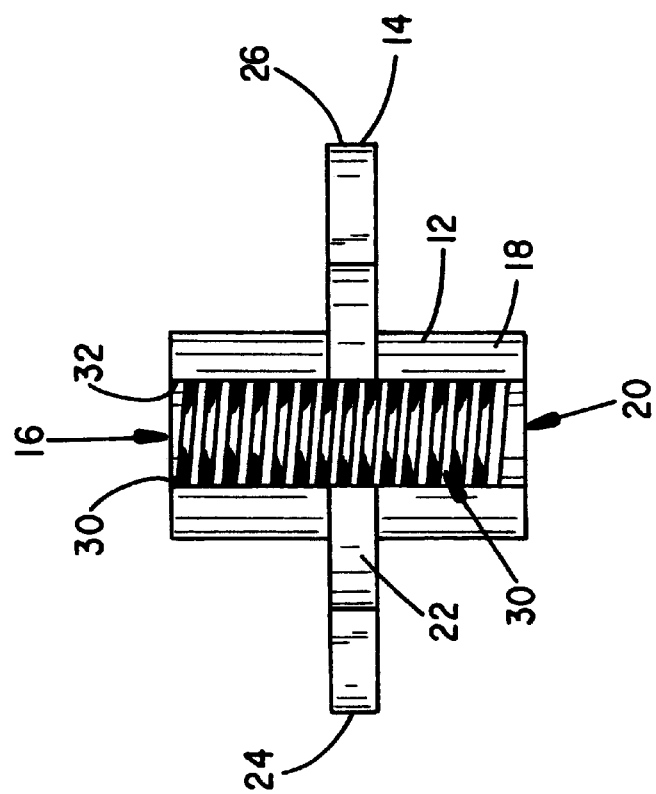
FIG. 3 is a side view of the snap nut of the present invention.

The present invention is a resilient snap nut shown in FIG. 1 and designated 10. The snap nut 10 is preferably a molded tubular body 12 of a predetermined wall thickness and with a flange 14 extending radially around wall 18. The material is preferably a nylon plastic, however any other comparable polymer materials with sufficient resilience may be used. A longitudinal bore 16 is internally threaded, as seen in FIGS. 1 and 3 with the threads designated 30. Extending through the side wall 18 of tubular body 12 is a longitudinal slot 20 defined by edges 30 and 32 of wall 18. The slot 20 has a width that is slightly less than the diameter of the bore 16.

Figure 2:
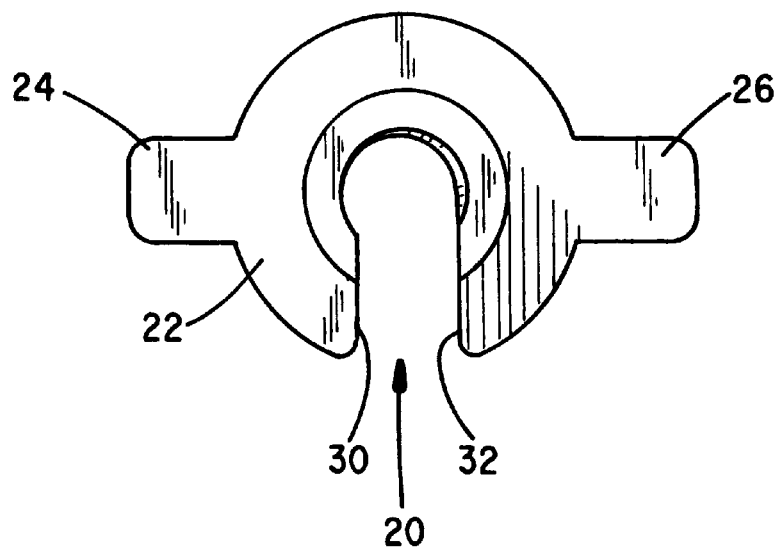
FIG. 2 is a top view of the snap nut of the present invention.

As seen in FIG. 2, the radially extending flange 14 includes two ears 24 and 26 projecting from the edge of the flange. These ears are diametrically opposed from each other around the circumference of tubular wall 18 and provide a convenient grip for turning the nut on a threaded rod or bolt, obviating the need for a wrench or pliers. Preferably, slot 20 is positioned midway between ears 24 and 26.

Figure 4:
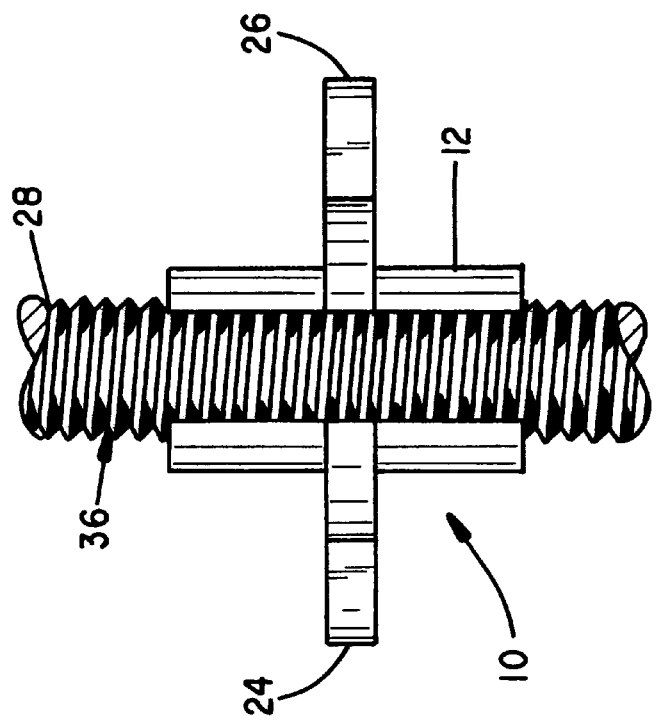
FIG. 4 is a front view of a snap nut secured to an elongated threaded rod.

In use, the nut 10 may be snapped onto an elongated threaded rod such as rod 28 in FIG. 4. The nylon plastic or other suitable plastic from which the nut 10 is formed is sufficiently resilient to allow edges 30 and 32 of the body 12 to spread open slightly when forced against the side of the rod 28. As the snap nut 10 centers on rod 28, the wall re-closes to a circular profile concentric with the rod 28 such that threads 34 of the snap nut engage the threads 36 on rod 28. This allows the snap nut 10 to be repositioned along rod 28 by simply rotating the snap nut 10 to the desired position in a conventional manner.

Figure 5:
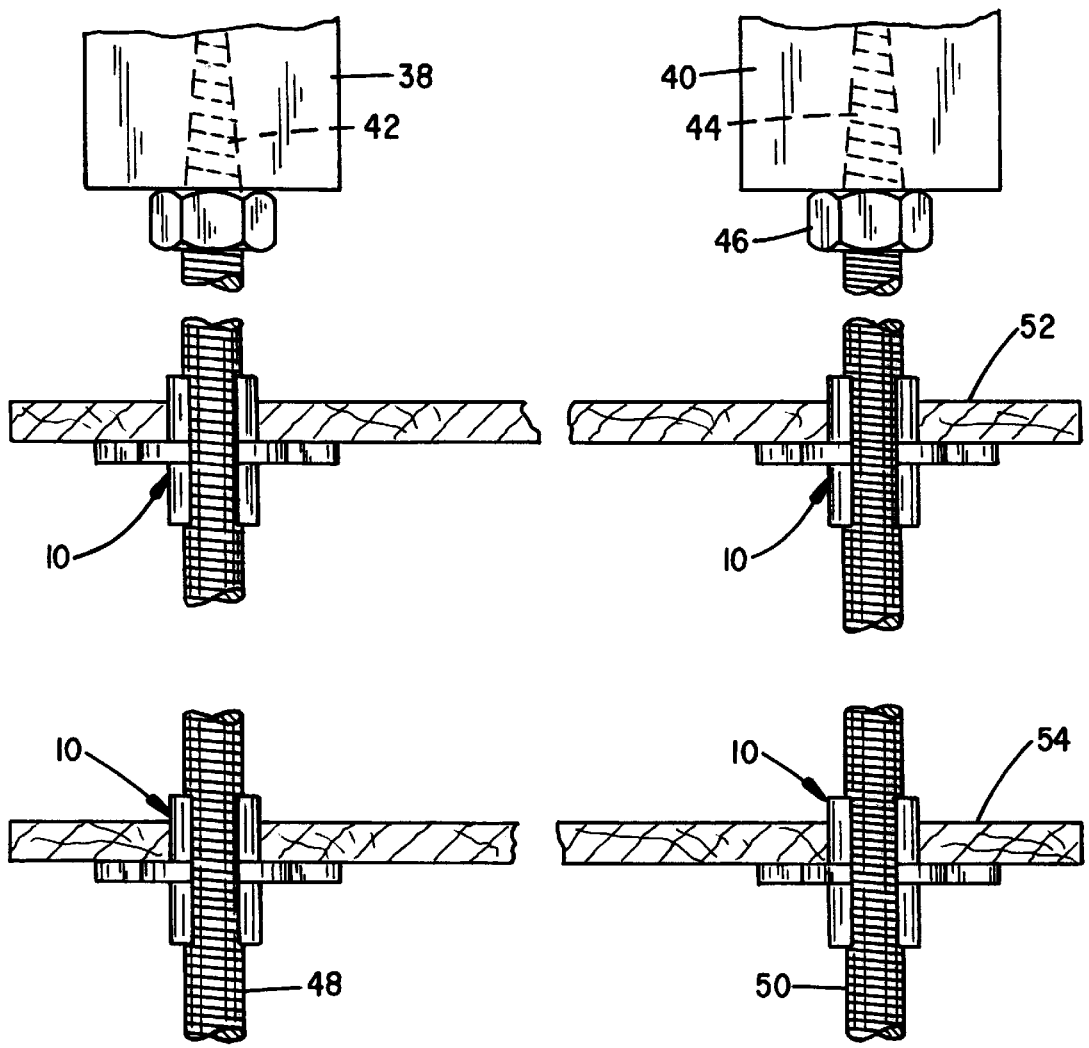
FIG. 5 is a front view of one use of the present invention in conjunction with two threaded rods and a shelf.

Referring to FIG. 5, there is shown one exemplary application of the snap nuts comprising the preferred embodiment of the present invention. The nuts are used in supporting closet shelving from ceiling joists. More particularly, two parallel, spaced-apart ceiling joists 38 and 40 are shown and threaded into the bottom surface of the ceiling joists are self-tapping screws 42 and 44 of the type described in the U.S. Pat. No. 5,518,351 to Peil. As is explained in that patent, the screws 42 and 44 each have a hex nut, as at 46, swaged or otherwise affixed at the head end thereof where the nut is internally threaded so as to receive the upper ends of threaded rods 48 and 50 therein. The rods 48 and 50 are of a predetermined length dependant upon the overall shelf design desired. One or more pre-drilled boards, as at 52 and 54, are assembled onto the threaded rods 48 and 50 and then snap nuts 10 are squeezed onto the rods in the manner previously described so that the shelf boards 52 and 54 are supported on the flanges 22 thereof. The shelves may be easily leveled by rotating the snap nuts once they are assembled onto their threaded rods. Once the shelf board is lowered onto the flange of the snap nut, the upper portion of the snap nut above the flange fits tightly into the hole in the shelf board, preventing the snap nut from spreading and disengaging from the threads on the rod.

Because the snap nuts can be assembled onto their associated rods at any point along the length of the rods, it is no longer necessary to screw the nuts from a free end of the rods up several feet which, of course, is quite time consuming.

Those skilled in the art will appreciate that there are many other applications for the use of the snap nuts of the present invention. For example, the combination of snap nuts and threaded rods supported by ceiling joists can be used for suspending the pipes of a sprinkler system or other plumbing, heating ducts, suspended ceiling panels, etc.

Figure 6:
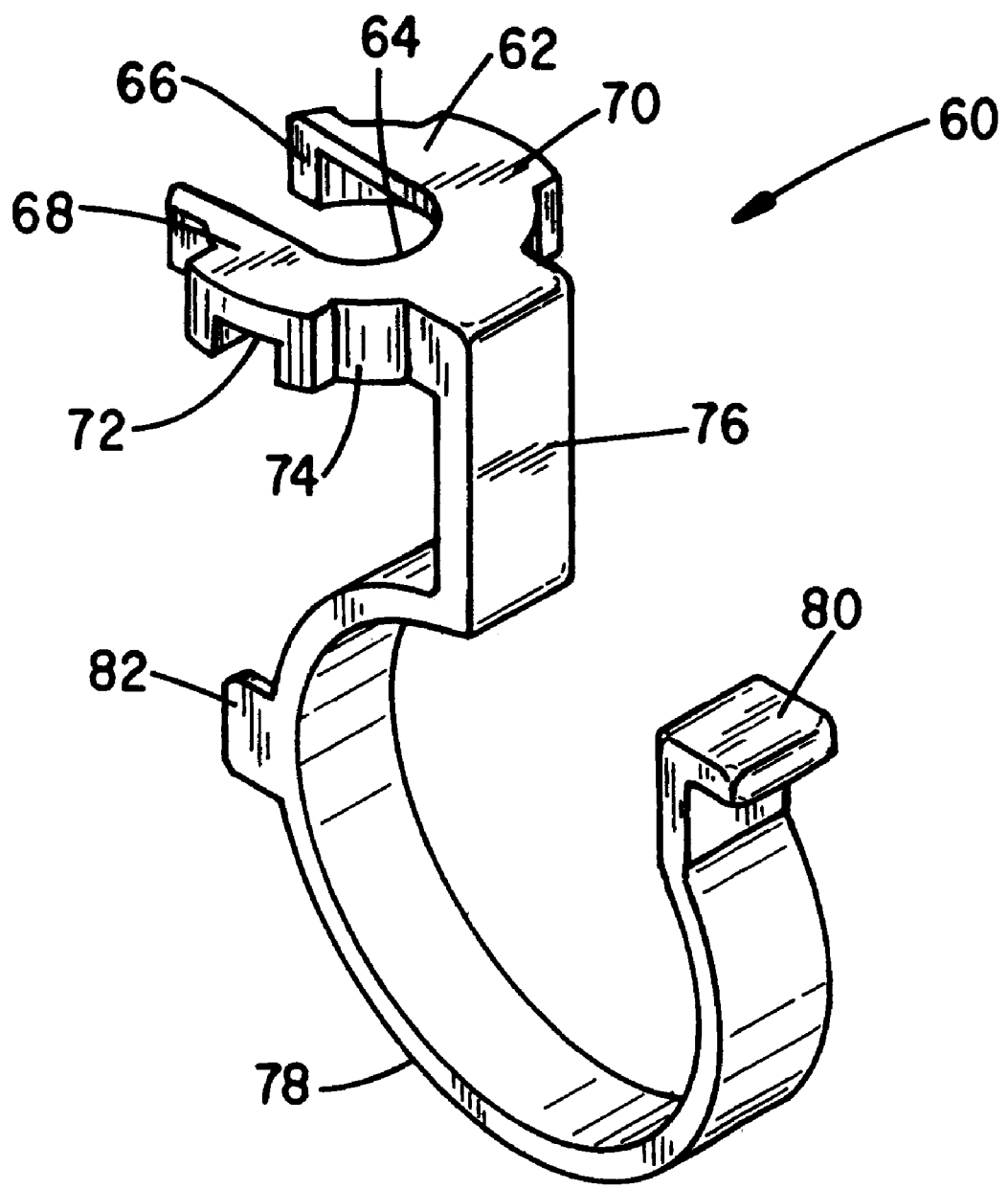
FIG. 6 is a perspective view of a support hook especially designed for use with the snap nut of the present invention.
Figure 7:
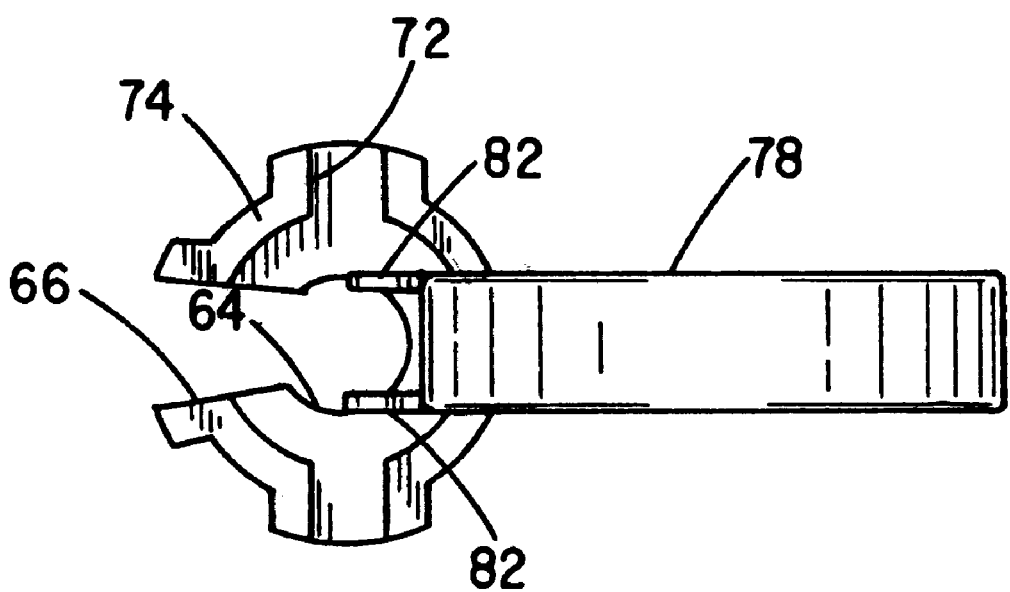
FIG. 7 is a bottom view of the hook of FIG. 6.

To facilitate suspending pipes, wiring, closet poles, etc., the hook arrangement illustrated in FIGS. 6 and 7 can readily be utilized. Referring first to FIG. 6, the hook is indicated generally by numeral 60 and preferably will be molded from a suitable plastic, such as nylon. It comprises an attachment base 62 which is generally circular in configuration and has a tapered slot 66 extending through its thickness dimension. Diametrically opposed, radially extending projections 68 and 70 are provided and a notch or groove 72 is formed therein that extends through the downwardly depending wall 74 of the connector base 62.

Integrally formed with and projecting downwardly from the connector base 62 is a shank portion 76 of generally rectangular cross-section, which integrally connects to an arcuate hook portion 78. The free end of the hook 78 terminates in an L-shaped flange 80. Located along the hook 78 so as to be vertically aligned with the central opening 64 in the connector base 62 are parallel, spaced-apart tabs as at 82. The hook member 60 is readily formed in a plastic molding operation.

Figure 8:
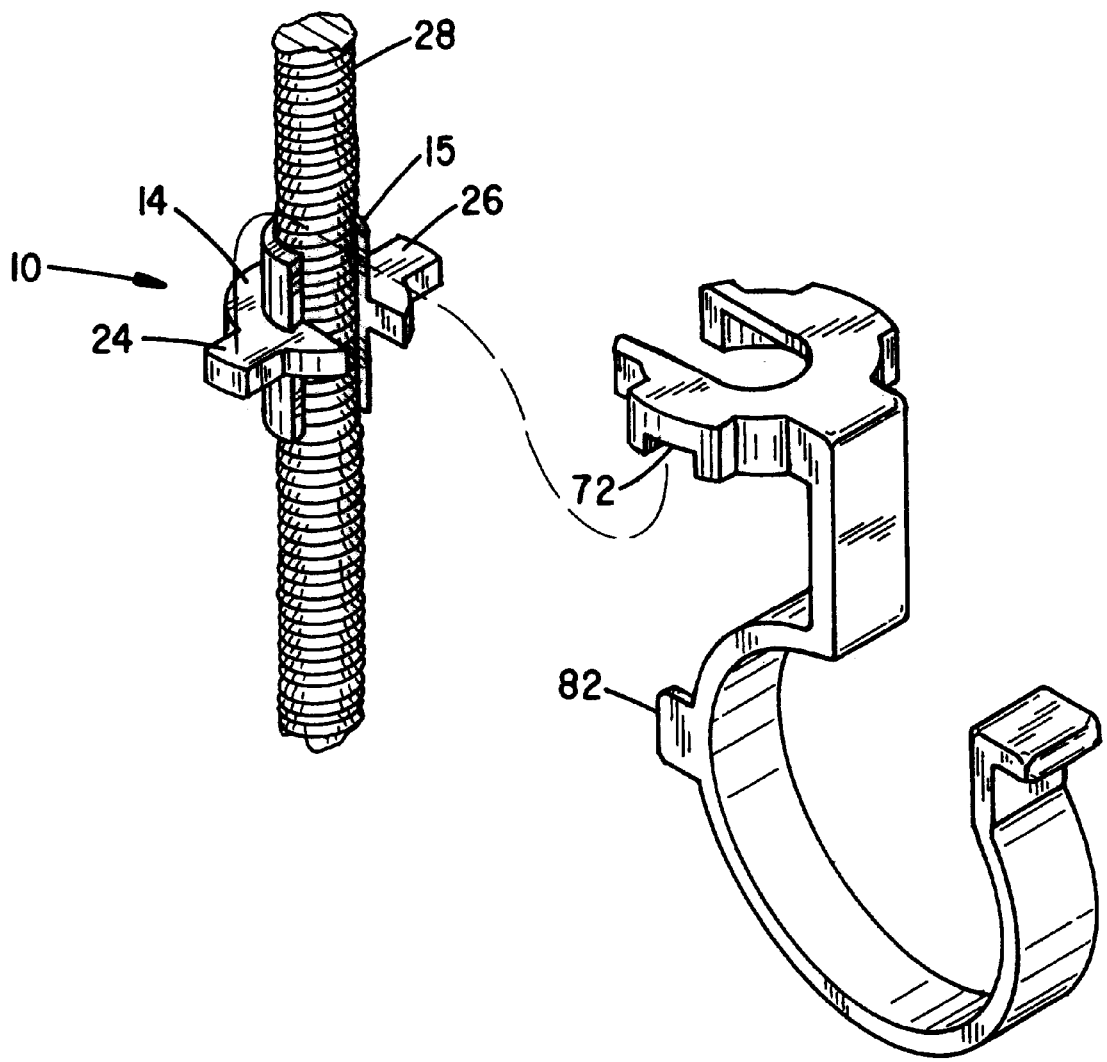
FIG. 8 is an exploded perspective view of the hook member of FIG. 6 when assembled onto a threaded rod using the snap nut of the present invention.

Referring now to FIG. 8, the manner in which the hook of FIG. 6 cooperates with the snap nut 10 assembled on a threaded rod 28 will be explained. As seen in FIGS. 6 and 7, the tapered slot 66 is dimensioned to allow the threaded rod 28 to fit therethrough from the side and the inside diameter of the circular aperture 64 is dimensioned to permit the portion of the snap nut between the flange 14 and its upper end 15 to fit within the circular aperture 64 when the ears 24 and 26 of the snap nut are fitted into and reside within the groove 72 formed in the bottom of the attachment base 62. The I.D. of the central aperture 64 is made only slightly larger than the O.D. of the portion of the snap nut fitting therethrough so that the attachment base 62 inhibits any tendency of the snap nut to spread and possibly slip down the threaded rod even when under heavy load.

The tabs 82 straddle the threaded rod 28 when the hook is assembled onto the snap nut, thereby resisting any side forces that might be applied to the hook portion 78 from tipping the attachment base to the point where it might become disengaged from the flanges 24 and 26 of the snap nut 10.

This invention has been described herein and in considerable detail in order to comply with the patent statutes and to provide those skilled in the art with the information needed to apply the novel principles and to construct and use such specialized components as are required. However, it is to be understood that the invention can be carried out by specifically different equipment and devices, that various modifications can be accomplished without departing from the scope of the invention itself.

What is claimed is:

1. A support structure, comprising:

a threaded rod;

a snap nut comprising a tubular body member having first and second ends and made from a resilient material, the tubular body member having a threaded bore of a predetermined diameter, a flange extending radially around the tubular body member between the first and second ends and a longitudinal slot extending through the flange and tubular body member and into the bore, the slot having a width that is less than the predetermined diameter of the threaded bore, wherein the width of the slot and resiliency of the material allows the threaded rod to compressionally pass laterally through the longitudinal slot into the threaded bore; and an object defining an opening configured to receive the tubular body member of the snap nut between the flange and the first end.

2. A support structure of claim 1, wherein said resilient material is a nylon plastic.

3. A support structure of claim 1, wherein said flange includes a pair of radially projecting ears diametrically disposed from one another.

4. The support structure as in claim 3 wherein the object comprises:

a hook member having a base connector and an arcuate hook joined to the base connector, the base connector extending generally perpendicular to a plane containing the hook and having a central aperture dimensioned to receive said portion of the tubular body member therethrough and with slots formed in the base connector for receiving said pair of radially projecting ears of the snap nut therein.

5. The support structure as in claim 1 wherein the object comprises:

a shelf board having said bore formed through a thickness dimension thereof, the bore in the shelf board being of a diameter greater than an outer diameter of the tubular body member and less than that of the flange.

* * * * *